United States Patent Office

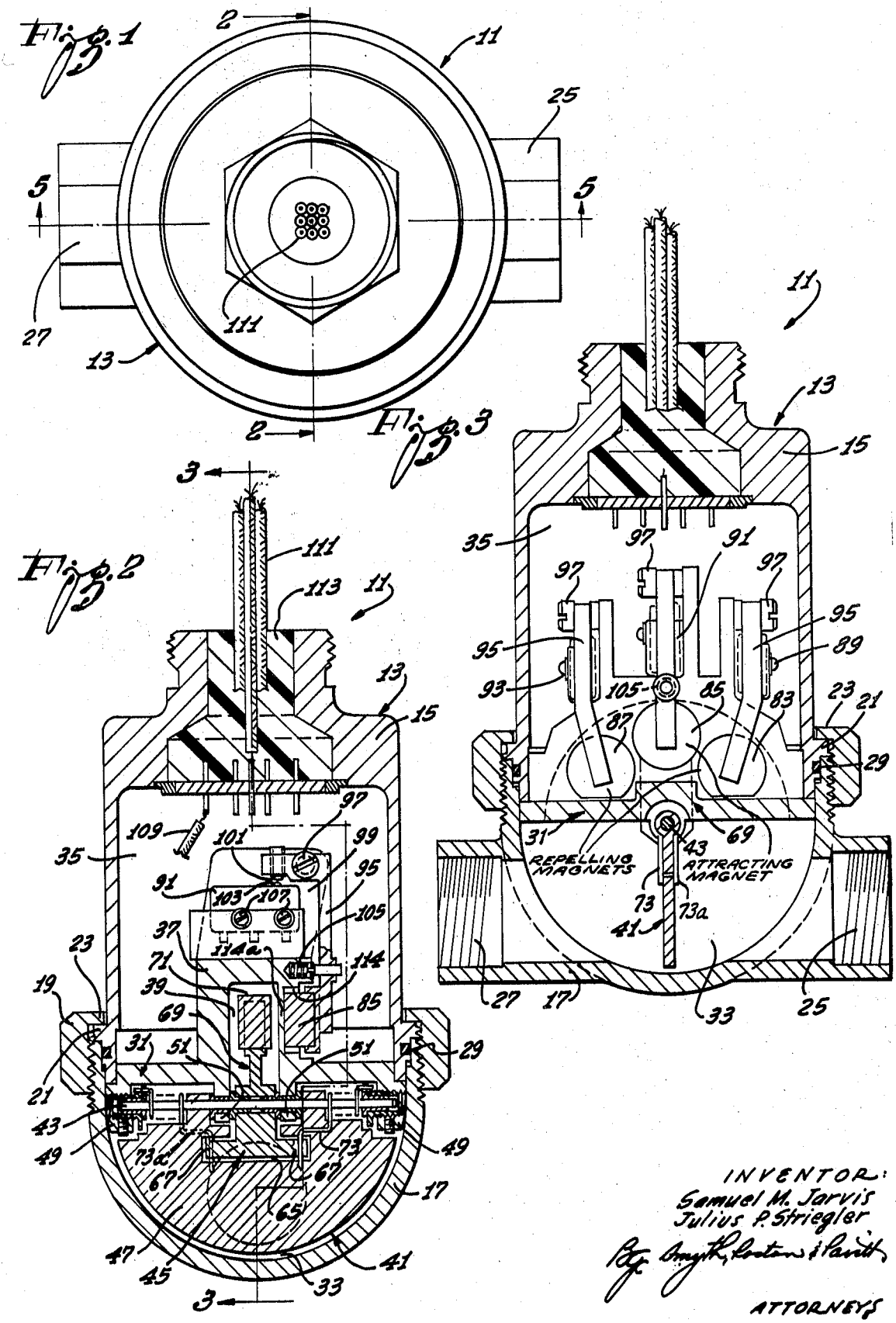

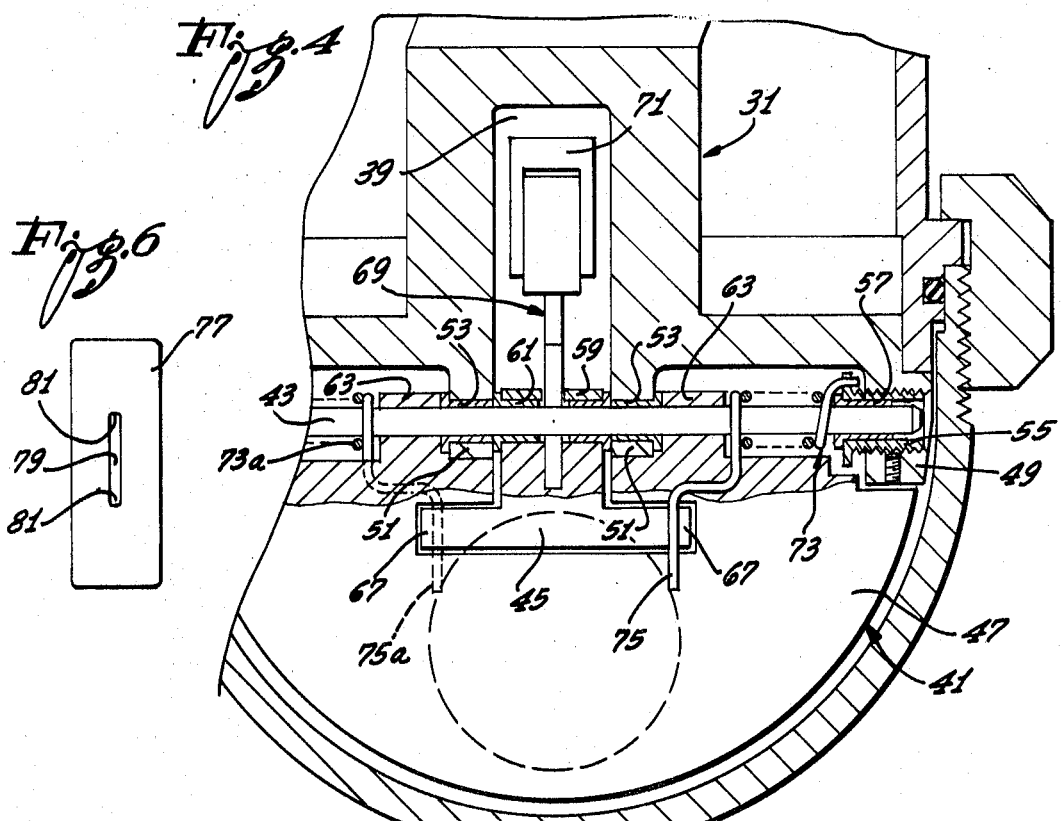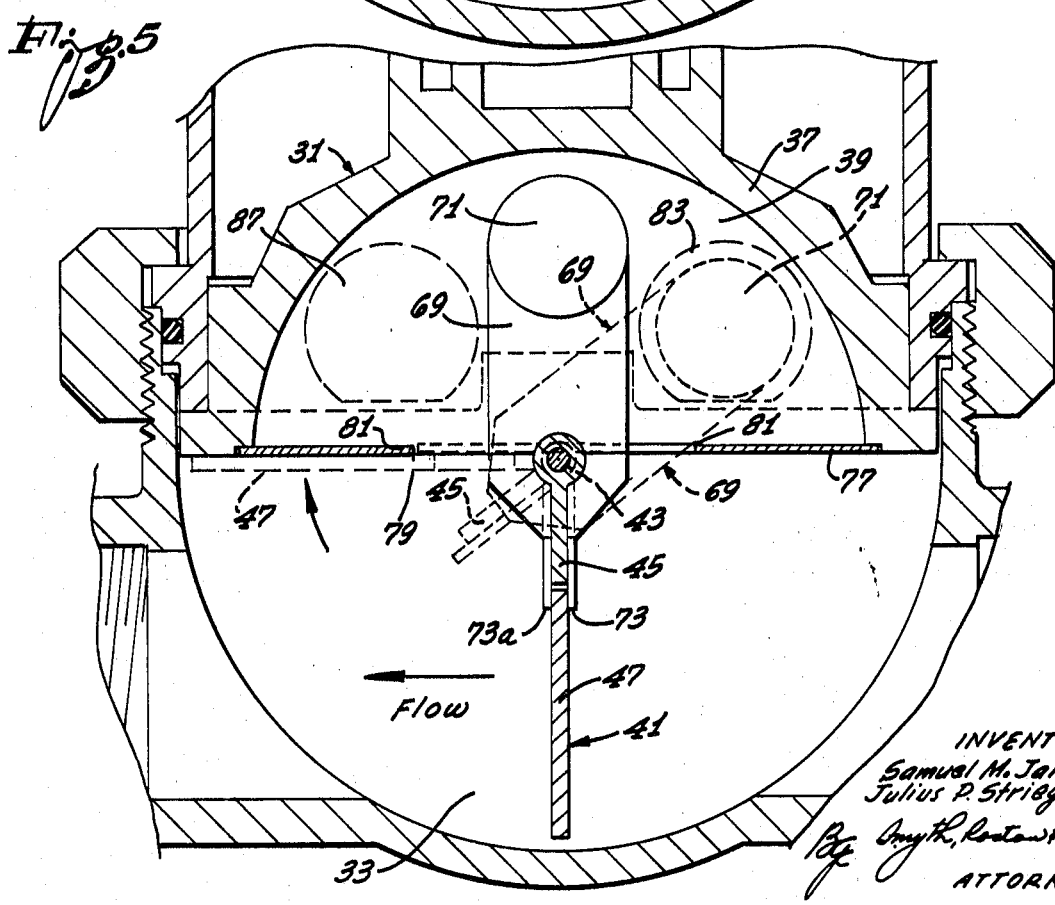

3,559,197
Patented Jan. 26, 1971

3,559,197
FLOW INDICATOR
Samuel M. Jarvis, Miraleste, and Julius P. Striegler, Garden Grove, Calif., assignors to Acme Machine Works, Inc., Hawthorne, Calif., a corporation of California
Filed Mar. 29, 1968, Ser. No. 717,179
Int. Cl. G08b 21/00
U.S. Cl. 340—239        14 Claims

ABSTRACT OF THE DISCLOSURE

This disclosure describes a flow indicator which may include a housing having a flow passageway therein and a vane pivotably mounted in said housing with at least a portion of the vane lying in the flow passageway. The vane pivots in response to fluid flow through the flow passageway and means responsive to the pivotal movement of the vane provides a signal or indication of the flow condition in the passageway. Preferably, the vane includes first and second vane sections which are pivotable independently so that one of the vane sections, under relatively high flow conditions, can be pivoted to substantially reduce the amount of resistance to fluid flow provided thereby.

BACKGROUND OF THE INVENTION

Flow indicators can give useful information such as the presence or absence of flow in a conduit, the direction of flow through the conduit, and whether the flow rate has exceeded a predetermined amount. A typical prior art flow indicator includes a vane extending into a flow passageway. A spring tends to hold the vane in a neutral position when no fluid is flowing through the conduit. The vane is responsive to flow of fluid in the conduit and is pivoted by the flow of fluid therethrough.

Thus, pivotal movement of the vane in a given direction provides an indication of flow in a particular direction through the conduit. If the vane pivots a predetermined amount or to a predetermined flow indicating position, the operator is advised that at least a predetermined quantity of fluid is flowing through the conduit.

It is desirable to use magnetic means to actuate a switch or other means to provide a signal which indicates a particular flow condition. For example, a movable magnet may be provided at the neutral position and at the flow indicating position and the vane may be drivingly connected to a suitable indicating element which causes magnetic movement of the magnets when the vane reaches each of the positions thereof. The vane may be moved past the flow indicating position when flow is increased beyond a predetermined level and when this occurs, the magnetic effect between the element and the adjacent magnet at the flow indicating position may be reduced to the extent that no indication or signal is provided thereby. Although a stop could be provided to prevent overtravel of the vane, the vane would then interpose a substantial resistance in the flow passageway to any increase in fluid flow therethrough. As resistance to fluid flow in the conduit is desirably kept to a minimum, this solution is not a practical one.

Another problem with the prior art flow indicators is brought about by the need to center or return the vane to the neutral position thereof when flow through the conduit ceases. The prior art devices rely on opposing centering springs which urge the vane in opposite directions and the forces of which are balanced in the neutral position. These springs, however, do not always center the vane properly because the centering force reduces rapidly as the neutral position is approached. Without proper centering the indicator will not be able to relate the correct flow condition within the conduit.

Another function of the centering springs is to provide resistance to pivotal movement of the vane as the vane moves toward the flow indicating position. The greater the resistance, the higher the flow rate at the indicating position. Often it is necessary to change the flow rate at the indicating position and with the prior art devices, the indicator must be at least partially dissembled and certain parts thereof completely replaced to achieve this adjustability. This is a time consuming process.

In one prior art unit, the indicating element moves in a narrow cavity which provides the narrowest of clearances on opposite sides thereof. The narrow clearance space is necessary because this particular indicator uses two magnets on opposite sides of the cavity, and therefore, the cavity must be of a minimum width in order that these two magnets can exert the necessary magnetic effect on each other. The narrow clearance space is not desirable because the cavity is exposed to the fluid within the flow passageway and even minor quantities of particular matter or contaminants tend to clog the clearance space to the extent that the indicating element will offer substantial resistance to movement thereof or will hang up and fail completely.

SUMMARY OF THE INVENTION

The present invention generally solves all of the above noted problems. The present invention teaches that the vane element can be stopped at the fluid-indicating position and the vane can be moved out of the flow passageway as necessary if the vane includes first and second vane sections pivotable together and relative to each other. An indicating arm or element, which initiates the signal producing action and is drivingly connected to the first vane section for movement along a path corresponding to positions of the first vane element. Stop means arrest pivotal movement of the first vane section at substantially the flow indicating position. The second vane section can continue to pivot, however, under the influence of an increased rate of flow to prevent it from acting as a barrier to such increase in flow rate. Thus, the resistance to fluid passing through the flow indicator of this invention, particularly at high flow rates, is significantly reduced and overtravel of the first vane section is prevented to thereby assure proper functioning of the indicator at the flow indicating position.

When the vane is pivoting between the neutral and flow indicating positions, it is desirable that both sections thereof pivot together as a unit. However, after the first vane section reaches the flow indicating position, pivotal movement thereof should stop while pivotal movement of the second section should be permitted to continue. The present invention accomplishes this function by providing yieldable means which tends to urge the vane sections together. However, the strength of the yieldable means is selected so that when the first vane section strikes the stop, the increased flow through the flow passageway acting on the second vane section pivots the second vane section out of the way against the biasing force of the yieldable means. The present invention also teaches that it is desirable to have the second vane section be considerably larger than the first vane section so that the largest possible area of the vane can be moved out of the flow passageway to prevent it from resisting flow of fluid therethrough.

It is desirable that the vane afford some resistance to movement from the neutral to the flow indicating position and to this end, a pair of springs may be provided for urging the vane in opposite directions. To simplify construction and to reduce the cost of the flow indicator, the present invention teaches that the same springs which are used for causing the vane sections to pivot as a unit may be utilized to resist pivotal movement of the vane between the neutral and flow indicating positions.

The purpose of providing resistance to the movement of the vane from the neutral to the flow indicating position is so that the flow indicating position will not be reached until at least a predetermined quantity of fluid is flowing through the conduit. By adjusting this resistance, the flow rate at the indicating position can be correspondingly adjusted. The present invention substantially simplifies the adjusting procedure by providing easily accessible means for adjusting the two springs to thereby adjust the resistance to movement of the vane. Preferably, such means include a rotatable member to which one end of the spring is attached and the rotatable member can be turned to adjust the torsion of the spring to thereby adjust the resistance to movement of the vane.

The springs described above have also served the purpose of tending to center or move the vane to the neutral position thereof. However, as described hereinabove, the centering force exerted by springs rapidly reduces as the neutral position is approached. Accordingly, the present invention teaches that magnetic means may be appropriately arranged to further tend to center the vane and that such magnetic means may also be used to initiate a signal indicative of a flow condition in the conduit.

To this end, a housing may be provided having a wall member therein for dividing the housing into a chamber and the flow passageway. The wall member defines a cavity which is covered by a slotted plate and in which the indicating element is pivotable. The slotted plate reduces flow into the cavity and may be used as the stop for the first vane section. The indicating element includes a magnet and a second magnet is provided in the chamber at the neutral position with the second magnet being movable in the chamber to initiate a flow indicating signal. According to the present invention, both of these magnets are attracting magnets so that when the vane is in the neutral position, the second magnet moves toward the first magnet and when the vane is out of the neutral position, yieldable means urge the second magnet away from the wall member. This movement of the second magnet is utilized to constitute or produce a flow indicating signal.

The significance of the magnet arrangement described above is that with both of the magnets being attracting magnets, there is an additional force tending to urge the vane toward the neutral position. Thus, as the neutral position is approached, the two attracting magnets come closer together and the force of attraction therebetween increases to assure that the vane will be properly centered.

It is often desirable to provide a third magnet located at the flow indicating position, which magnet is also movable in response to the positioning of the magnet on the indicating element at the flow indicating position. According to the present invention, the magnet on the indicating element and the magnet at the flow indicating position are preferably repelling magnets so that the magnet on the indicating element is repelled away from the flow indicating position and toward the neutral position. This constitutes still a third force acting on the vane tending to return it to the neutral position. These three forces combine to substantially increase reliability of the flow indicator by assuring that the vane will be promptly and accurately moved to the neutral position during a no-flow condition. These forces are not, however, sufficient to substantially resist proper operation of the vane in moving from the neutral to the flow indicating position.

Still another advantage of using a magnet on the indicating element and a magnet in the chamber is that there may be a substantial clearance space in the cavity surrounding the magnet on the indicating element. Thus, clogging of this clearance space is much less likely to occur.

The invention, both as to its organization and method of operation together with further features and advantages thereof may best be understood by reference to the following description taken in connection with the accompanying illustrative drawing.

BRIEF DESCRIPTION OF THE DRAWINGS

FIG. 1 is a top plan view of a flow indicator constructed in accordance with the teachings of this invention.

FIG. 2 is a sectional view taken along line 2—2 of FIG. 1.

FIG. 3 is a sectional view taken generally along line 3—3 of FIG. 2.

FIG. 4 is an enlarged fragmentary sectional view illustrating a lower portion of the indicator as shown in FIG. 2.

FIG. 5 is an enlarged fragmentary sectional view taken generally along line 5—5 of FIG. 1, with the magnets shown in dashed lines.

FIG. 6 is a plan view of the slotted plate.

DESCRIPTION OF THE PREFERRED EMBODIMENTS

Referring to the drawings and in particular to FIGS. 1–3 thereof reference numeral 11 designates a flow indicator constructed in accordance with the teachings of this invention. The flow indicator 11 includes a housing 13 which includes an upper section 15 and a lower section 17 which are held together by a nut 19. As shown in FIGS. 2 and 3, the nut 19 and the lower section 17 are threadedly interconnected while flanges 21 and 23 on the upper section 15 and the nut engage to hold the nut and the upper section together. The lower section 17 has threaded ports 25 and 27 either of which may form an inlet or an outlet for the housing 11 and a suitable seal 29 prevents leakage outwardly between the sections 15 and 17.

A wall member 31 is suitably mounted within the housing 11 and divides the housing into a flow passageway 33 and a chamber 35. The wall member 31 has a section 37 of generally channel-shaped cross section which defines a cavity 39 which opens downwardly and communicates with the flow passageway 33. The wall member 31 may be mounted within the housing 11 in any suitable manner. A gate or vane 41 is pivotally mounted within the housing 11 by a shaft 43 as shown in FIGS. 2–5. As best seen in FIGS. 2, 4 and 5, the vane 41 includes a first relatively small vane section 45 and a second relatively large vane section 47, both of which are pivotally mounted on the shaft 43. The wall member 31 has two outer apertured attaching lugs 49 and two apertured inner attaching lugs 51 (FIG. 2). As best seen in FIG. 4, the shaft 43 projects through sleeve bearings 53 which are mounted in the attaching lugs 51. Each of the attaching lugs 49 is internally threaded and receives a hollow screw 55. A bearing 57 is suitably mounted within each of the hollow screws 55 and the bearing receives the shaft 43. The section 17 can be unscrewed to provide convenient access to the screw 55.

The first vane section has a hollow section 59 with bearings 61 therein which receives a central portion of the shaft 43 between the lugs 51. The vane section 47 has two hollow sections 63 which receive portions of the shaft 43 immediately outside of the attaching lugs 51.

The second vane section 47 is generally of semi-circular configuration as shown in FIG. 2 and is spaced slightly inwardly from the lower housing section 17. The vane section 47 has a cutout region 65 of irregular shape in which the first vane section 45 is normally located. The vane section 45 has a central portion and a pair of laterally extending webs 67.

An indicating arm or element 69 which includes a magnet 71, and is drivingly connected to the first vane section 45, and in the embodiment illustrated the element and vane section 45 are interconnected. The indicating arm 69 is movable within the cavity 39. Two torsion coil springs 73 and 73a are wound on the shaft 43 and serve as yieldable means for urging the vane sections 45 and 47 into the same plane. One end of the spring 73 is secured to the screw 55 and a corresponding end of the spring 73a is similarly connected to the other screw 55. The springs 73 and 73a have end portions 75 and 75a which extend along opposite faces, respectively, of the vane 41. Specifically, the end portions 75 and 75a extend across portions of the second vane section 47 and across the web 67 of the first vane section 45 as shown in FIGS. 2 and 4.

The springs 73 and 73a perform three basic functions. First, the spring 73 resists the tendency of the two vane sections 45 and 47 to separate in a first direction while the spring 73a resists the tendency of the gate sections to separate in the other direction. Secondly, the springs 73 and 73a resist any movement of the vane 41 away from the neutral or centered position shown in FIGS. 2-4. Thus, the springs 73 and 73a serve to center the vane 41. Third, the torsion in each of the springs 73 and 73a can be varied by turning of the screw 55 to which one end of the spring is attached. By varying the torsional force set within each of the springs, the amount of resistance to pivotal movement of the vane 41 can be adjusted.

A plate 77 (FIGS. 5 and 6) having a slot 79 therein is suitably mounted on the lower end of the wall member 31. The plate 77 separates the flow passageway 33 from the cavity 39 and the slot 79 provides the only path of communication therebetween. As shown in FIG. 5, the indicating arm 69 projects through the slot 79 and into the cavity 39. Surfaces 81 at opposite ends of the slots 79 form abutments or stops for limiting the pivotal movement of the indicating arm 69 as described more fully hereinbelow.

Three magnets 83, 85 and 87 are mounted for movement within the chamber 35 for operating three switches 89, 91 and 93, respectively (FIG. 3). As shown in FIG. 2, the magnet 85 is mounted on an arm 95 which is suitably pivotally mounted as by a screw 97 to a support bracket 99. The arm 95 carries an actuator 101 which is engageable with a button 103 of the switch 91. A spring 105 suitably mounted within the wall member 31 normally urges the arm 95 outwardly away from the wall member, i.e. in a counterclockwise direction about the screw 97 as viewed in FIG. 2. With the arm 95 moved outwardly, the actuator 101 engages and depresses the button 103 to actuate the switch 91. The switch 91 has terminals 107 which may be suitably connected to an external circuit as by conductors 109 and 111 the latter of which projects through a plug 113 of insulating material suitably mounted in the upper wall of the upper housing section 15. Of course, actuation of the switch 91 by counterclockwise movement of the arm 95 may serve to either open or close a circuit.

The magnet 71 on the indicating arm 69 and the magnet 85 on the arm 95 are preferably attracting magnets. Thus, when the vane 41 is in the neutral or centered position, the magnet 71 pulls the magnet 85 toward the wall member 31 against the force of the spring 105 to thereby prevent the actuator 101 from actuating the switch 91. In this position the magnet 85 is seated in a recess 114 against a thin wall portion 114a (FIG. 2). However, when the vane 41 and the arm 69 thereof move out of the neutral position, the force of attraction between the magnet 71 and 85 decreases to the extent that the spring 105 urges the arm 95 outwardly away from the wall member 31 to cause actuation of the switch 91. The actuation of the switch 91 provides an indication that there is some flow through the flow passageway 33.

The magnets 83 and 87 and the switches 89 and 93 are identical to the construction shown in FIG. 2 except that the magnets 83 and 87 are repelled by the magnet 71 and the spring 105 is not used. Thus, as shown in FIG. 3, each of the magnets 83, 87 are carried by arms 95 which are pivotally mounted by screws 97. When the vane 41 is in the neutral position, the weight of the arms 95 for the magnets 83 and 87 holds the arms 95 in the position shown in FIG. 2 in which the switches 89 and 93 are not being actuated by their respective arms 95. Assuming, however, that flow through the flow passageway 33 moves the magnet 71 adjacent the magnet 87, the magnet 87 is repelled to cause the arm 95 therefor to actuate the switch 93. Similarly, if flow through the flow passageway 33 is in the opposite direction, the magnet 83 is repelled to cause actuation of the switch 89. Thus, by appropriately connecting the switches 89 and 93 to an external circuit, the switches can indicate flow direction and also that flow is at least of a predetermined flow rate.

In use of the flow indicator 11, the ports 25 and 27 thereof can be suitably affixed to end portions of conduits. When no fluid is flowing through the conduits and the flow passageway 33, the vane 41 is held in the neutral or centered position shown in FIGS. 2-4 and in full lines in FIG. 5 by three separate forces. First, the springs 73 and 73a tend to bias the vane 41 to the neutral position. Secondly, the magnets 71 and 85 are arranged to attract each other to thereby tend to hold the vane in the neutral position. Third, the magnets 83 and 87 to some extent repel the magnet 71 to thereby further tend to maintain the vane 41 in the neutral position.

In the neutral position none of the switches 91 are actuated to thereby provide an indication to a suitable external circuit that no fluid is flowing through the indicator 11. Assuming that fluid should be forced through the flow passageway 33 in a direction from the port 25 to the port 27, such fluid flow tends to pivot the vane 41 about the shaft 43. Such pivotal movement of the vane 41 moves the magnet 71 and eventually becomes sufficient so that the force of the spring 105 (FIG. 2) can now urge the arm 95 outwardly to actuate the switch 91. Such actuation of the switch 91 provides a signal advising the operator that fluid is now flowing through the flow passageway 33.

Assuming that the fluid flow through the flow passageway 33 is sufficient, the vane 41 will be pivoted until the magnet 71 becomes directly opposite the magnet 83. At this instant, the magnet 83 is repelled to actuate the switch 89 to thereby provide a signal indicating the direction of flow and that the quantity of flow has reached a predetermined amount. At the same instant, the indicating arm 69 strikes the abutment 81 (FIG. 5) to thereby prevent the indicating arm and the section 45 of the vane affixed thereto from pivoting further about the shaft 43. If the flow rate through the flow passageway 33 increases, the second section 47 of the vane 41 will pivot a greater amount about the shaft 43 independently of the section 45 and against the biasing action of the spring 73a to the position shown in FIG. 5 in which the section 47 is substantially completely out of the flow passageway and offers virtually no resistance to flow therethrough. With this arrangement, only the relatively small section 45 extends into the flow stream. When flow through the passageway 33 subsides, the sections 45 and 47 of the vane 41 return to the neutral position under the influence of the springs 73, 73a and the magnets.

It should be noted that there is a substantial clearance space between the walls of the cavity 39 and the arm 69. This is made possible by the use of the magnet 71 within the cavity 39 and the magnets 83, 85 and 87 located immediately outside of the cavity 39 and across the thin wall section 114a. The operation of the flow indicator 11 is the same if the direction of flow is reversed except that the vane 41 moves in the opposite direction to actuate the switch 93.

Although exemplary embodiments of the invention have been shown and described, many changes, modifications, and substitutions may be made by one having ordinary skill in the art without necessarily departing from the spirit and scope of this invention.

What is claimed is:

1. A flow indicator comprising:

a housing having a flow passageway therein through which fluid can flow;

a vane including first and second vane sections;

means for pivotally mounting both of said vane sections for pivotal movement together and independently within said housing, said vane being at least partially in said flow passageway, first means for causing said vane sections (being pivotable) to pivot together to a flow-indicating position in response to a predetermined fluid flow in said flow passageway;

means responsive to the first vane section being in said flow-indicating position for providing an indication that fluid is flowing in said passageway; and stop means for preventing pivotal movement of said first vane section beyond said flow indicating position and consequent loss of said indication, said second vane section being free to pivot beyond said flow-indicating position under the influence of fluid flow of increased quantities through said flow passageway whereby the pivoting of the second vane section beyond said flow indicating position reduces the resistance offered by the vane to the flow of fluid through said flow passageway.

2. A flow indicator as defined in claim 1 wherein said first means includes means for urging said vane sections into a common plane so that said vane sections pivot together as said vane sections move toward the flow-indicating position, said fluid flow of increased quantities forcing said second vane section to pivot beyond the flow-indicating position against the force of said urging means.

3. A flow indicator as defined in claim 1 wherein said means for pivotally mounting includes a shaft and means for pivotally mounting both of said vane sections on said shaft.

4. A combination as defined in claim 1 including resilient means for resisting pivotal movement of said first vane section toward said flow indicating position and means for adjusting the amount of resistance to pivotal movement of said first vane section whereby the flow rate at which said flow indicating position is reached can be varied.

5. A flow indicator as described in claim 1 wherein the majority of the portion of the vane lying in said flow passageway is formed from said second vane section.

6. A flow indicator comprising:

a housing having a flow passageway therein through which fluid can flow;

a flow responsive vane including first and second vane sections;

means for mounting both of said vane sections for pivotal movement independently of each other about a pivotal axis extending generally transverse to the direction of flow through said flow passageway;

yieldable means for urging said vane sections to pivot together in generally the same plane about said pivotal axis, at least said second vane section projecting into said passageway whereby flow of fluid through said flow passageway pivots said vane sections as a unit about said pivotal axis, said vane being pivotable from a neutral position in which no fluid flows through the flow passageway to a flow indicating position in which at least a predetermined amount of fluid flows through the flow passageway;

an indicating arm;

means for drivingly connecting said indicating arm to said first vane section for movement along a path corresponding to the positions of said first vane section;

means at least partially adjacent the region of said path corresponding to said flow indicating position and responsive to the presence of said indicating arm at said region for providing an indication that at least said predetermined amount of fluid is flowing in said flow passageway; and stop means for stopping pivotal movement of said first vane section and said indicating arm when said indicating arm is substantially at said flow indicating position while allowing additional pivotal movement of the second vane section in response to an increase in flow of fluid of sufficient magnitude to overcome said yieldable means to thereby reduce the resistance to the flow of the fluid while preventing loss of said indication.

7. A flow indicator as defined in claim 6 wherein said yieldable means include spring means having first and second spring portions engaging portions of both of said vane sections on opposite sides of said vane, respectively, for urging said vane sections together, said spring means also urging said vane toward said neutral position.

8. A combination as defined in claim 6 wherein said indicating arm includes a first magnet and said means for providing an indication includes a second magnet adjacent said region of said path, said first magnet exerting a force on said second magnet when said indicating arm is in said region of said path sufficient to move said second magnet and said means for providing an indication is responsive to movement of the second magnet.

9. A combination as defined in claim 6 including wall means dividing said housing into said flow passageway and an indicating chamber with said means for providing an indication being in said indicating chamber, said wall member defining a cavity opening toward said flow passageway, said indicator arm being movable in said cavity, and a plate having a slot therein closing the mouth of said cavity to restrict flow into said cavity from said flow passageway, said indicating arm projecting through said slot.

10. A combination as defined in claim 9 wherein said stop means includes said plate.

11. A flow indicator comprising:

a housing defining a flow passageway therein;

a fluid flow responsive vane;

means for pivotally mounting said vane in said flow passageway, said vane being pivotable through a range of positions from a neutral position in which substantially no fluid flows in the flow passageway to a flow indicating position in which at least a predetermined quantity of fluid flows in said flow passageway;

a first magnet carried by said vane for movement along a path corresponding to the range positions;

a second magnet mounted in said housing adjacent the region of the path corresponding to the neutral position of said vane, said second magnet being movable toward said path, said first and second magnets being arranged to attract each other whereby said second magnet moves toward said first magnet when said vane is in said neutral position to thereby provide an indication of said neutral position and said second magnet tends to hold the vane in said neutral position; and a third magnet in said housing adjacent the zone of said path corresponding to said flow indicating position, said third magnet being mounted for movement toward and away from said path, said first and third magnets being arranged to repel each other whereby said third magnet moves away from said first magnet when said vane is in said flow indicating position to thereby provide an indication of said neutral position and said vane is urged toward said neutral position by said third magnet.

12. A flow indicator as defined in claim 6 wherein said means for mounting includes a shaft on which both of said vane sections are mounted, said indicator including resilient means on said shaft for urging at least one of said vane sections toward the neutral position and means for adjusting the force applied to said one vane section by said resilient means.

13. A combination as defined in claim 11 including yieldable means for urging said second magnet away from the path and urging said third magnet toward said path.

14. A combination as defined in claim 11 including a wall member dividing said housing into said flow passageway and a chamber, said wall member defining a cavity opening toward said flow passageway, said first magnet being in said cavity and said second and third magnets being in said chamber, said cavity being sufficiently large to receive said first magnet therein with substantial clearance space whereby clogging of such clearance space is less likely to occur.

References Cited

UNITED STATES PATENTS

| | | | |
|---|---|---|---|
| 2,421,768 | 6/1947 | Voliazzo et al. | 340—239 |
| 3,126,463 | 3/1964 | Kmiecik | 200—81.9 |
| 3,175,399 | 3/1965 | Medlar | 73—228 |
| 3,224,270 | 12/1965 | Karol et al. | 73—209 |
| 3,368,045 | 2/1968 | Harper | 200—81.9 |
| 2,677,023 | 4/1954 | Lee II | 340—239X |

DONALD J. YUSKO, Primary Examiner

D. MYER, Assistant Examiner

U.S. Cl. X.R.

73—228; 137—557; 200—81.9